United States Patent
Nakahara et al.

[11] Patent Number: 6,104,467
[45] Date of Patent: Aug. 15, 2000

[54] METHOD FOR MANUFACTURING LIQUID CRYSTAL DISPLAY DEVICE REQUIRING HIGH GAP ACCURACY

[75] Inventors: Makoto Nakahara, Nara; Kyouhei Isohata, Yamatokooriyama; Daisuke Ikesugi, Jouyou; Yoshiko Inagaki, Nara; Kazuya Yoshimura, Kitakatsuragi-gun, all of Japan

[73] Assignee: Sharp Kabushiki Kaisha, Osaka, Japan

[21] Appl. No.: 09/059,689

[22] Filed: Apr. 14, 1998

[30] Foreign Application Priority Data

Apr. 25, 1997 [JP] Japan ..................................... 9-109497

[51] Int. Cl.⁷ .................................................. G02F 1/1341
[52] U.S. Cl. ........................... 349/189; 349/190; 349/153
[58] Field of Search ..................... 349/187, 189, 349/190, 153

[56] References Cited

FOREIGN PATENT DOCUMENTS

| 07005476 | 1/1995 | Japan . |
| 07064101 | 3/1995 | Japan . |
| 09160053 | 6/1997 | Japan . |

*Primary Examiner*—William L. Sikes
*Assistant Examiner*—James A. Dudek
*Attorney, Agent, or Firm*—Nixon & Vanderhye P.C.

[57] ABSTRACT

A cell gap uniformity in the vicinity of a seal and inside a display region of a liquid crystal display device is enhanced. Further, even when a multi-daylight press is used in a substrate bonding process, a variation in cell gap depending on the stratal positions of substrates is suppressed. In the process of bonding together two substrates on which display use electrodes are formed, the two substrates are bonded together with interposition of a seal member and a spacer. Thereafter, first, the bonded substrates are pressurized according to a specified pressurization profile in a normal temperature state of, for example, 26° C., thereby extending the seal member. Subsequently, these substrates are pressurized according to a pressurization profile whose maximum pressure is set smaller than the maximum pressure in the normal temperature state with heat applied to the substrates, thereby hardening the seal member.

14 Claims, 12 Drawing Sheets

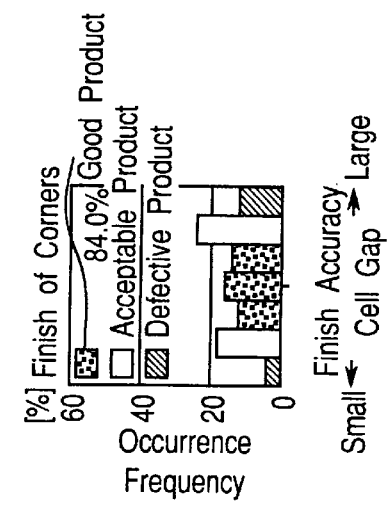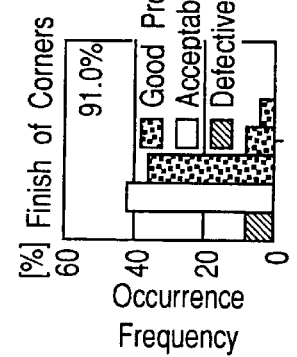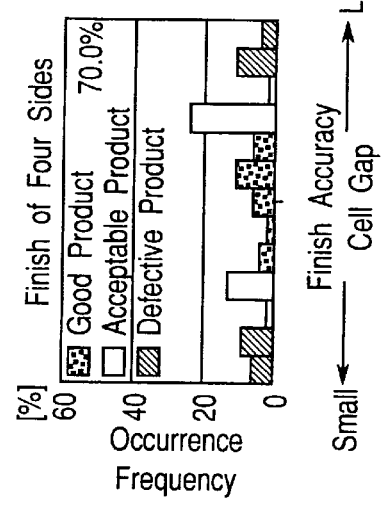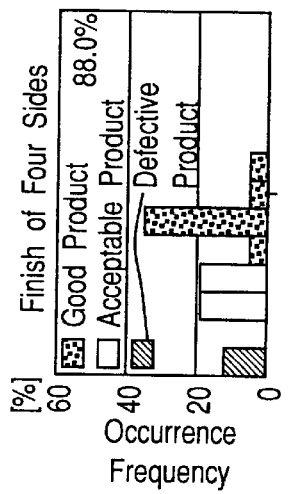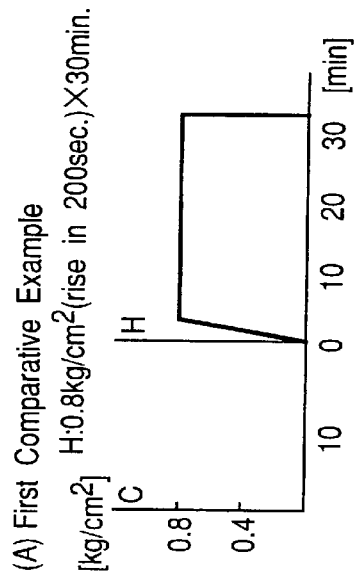
(A) First Comparative Example
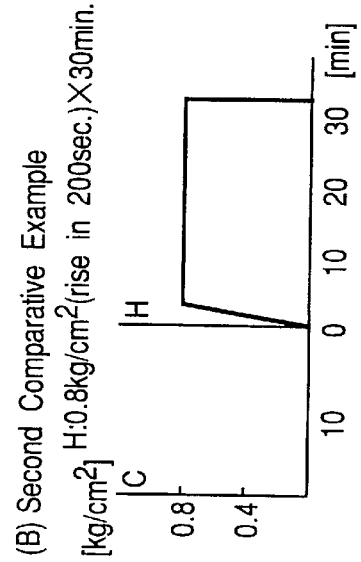
(B) Second Comparative Example

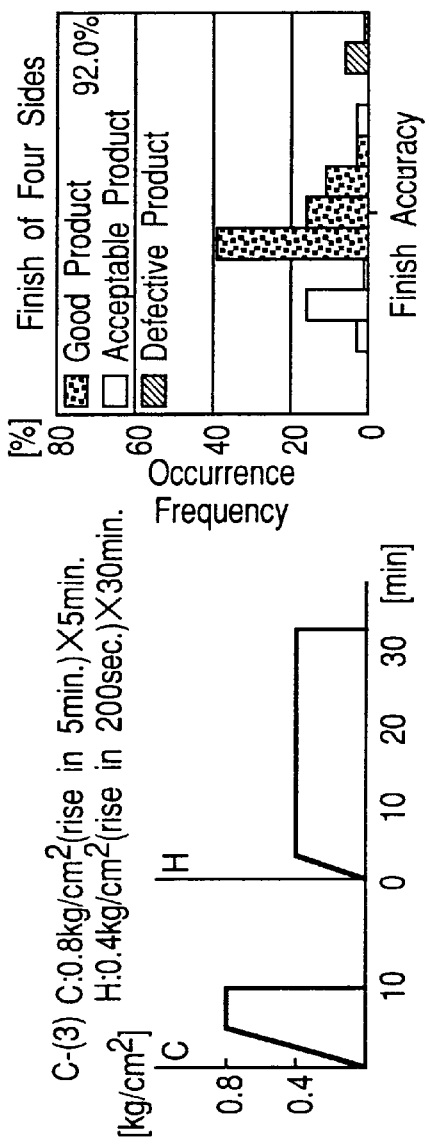

METHOD FOR MANUFACTURING LIQUID CRYSTAL DISPLAY DEVICE REQUIRING HIGH GAP ACCURACY

BACKGROUND OF THE INVENTION

The present invention relates to a liquid crystal display device manufacturing method, and in particular, to a method of manufacturing a super twisted nematic (referred to as an "STN" hereinafter) type liquid crystal display device, a ferroelectric type liquid crystal display device and the like to be appropriately used as a color display means for a liquid crystal display device requiring a high cell gap accuracy in a thin type portable personal computer such as a notebook type personal computer.

In a series of processes for manufacturing a liquid crystal display device, there is a process of bonding together a pair of substrates (each referred to as a electrode substrate hereinafter) on which a display use electrode, an alignment film and so on are formed with interposition of a seal member provided in the vicinity of a display section of the liquid crystal display device and a spacer scattered or distributed uniformly inside the display region. In this substrate bonding process, a gap between the pair of substrates, namely, a cell gap is almost determined.

Conventionally, the control of the cell gap in the substrate bonding process has been performed by stacking a pair or a plurality of electrode substrates that have been bonded together as described above and concurrently pressurizing and heating these electrode substrates by means of a hot press machine. In general, for the seal member, a thermosetting resin including glass beads or the like operating as a spacer inside the seal is used, and glass beads or plastic beads are used for the spacer (referred to as an intra-cell spacer hereinafter) inside the display region.

When a nonuniformity exists in the cell gap, and even if the degree of nonuniformity is very small, it will appear as a display nonuniformity such as color shift when lighting the resulting completed liquid crystal display device. Therefore, it is very important to bond together the electrode substrates so that the cell gap becomes uniform. However, in the case of the method of concurrently performing the pressurizing and heating of the electrode substrates, the cell gap sometimes becomes nonuniform unless the pressurizing and heating are performed in a well-balanced manner throughout the entire substrate.

In view of the above, for example, the document of Japanese Patent Laid-Open Publication No. HEI 7-64101 discloses a way of varying continuously or in steps a pressurization force from a specified high pressure to a specified low pressure at a specified temperature before the attainment of the thermosetting temperature of the seal member by heating so as to obtain a uniform cell gap.

However, the prior art methods of controlling the cell gap by concurrently performing the pressurizing and heating of the electrode substrates, including the technique disclosed in the document of Japanese Patent Laid-Open Publication No. HEI 7-64101 have the following problems.

In the process of bonding together the substrates of the liquid crystal display device, the cell gap immediately after the bonding of a pair of electrode substrates is equivalent to the thickness (about 25 $\mu$m) of a printed film of the seal member. When pressing the electrode substrates until the cell gap will come to have a specified value (6 $\mu$m, for example), the pressing is performed with heating, and therefore, air inside the liquid crystal cell enclosed by the seal resin expands by a rise in temperature. Furthermore, in a case where the liquid crystal cell is a liquid crystal display device provided with a color filter employing a protective film, the amount of generation of gas from the protective film is also considered to be increased by the pressurizing with heating. Consequently, the internal pressure of the liquid crystal cell in the pressing stage increases to exert a bad influence on the finish of the seal, and a cell gap uniformity in the vicinity of the seal cannot be obtained, causing a display nonuniformity in the vicinity of the seal.

For the intra-cell spacer are widely used plastic beads which can follow the thermal expansion and contraction of the liquid crystal material and are easily elastically deformed. However, this plastic spacer is a polymer of divinylbenzene and an acrylic substance, and therefore, it causes a shape deformation when simultaneously receiving heat and pressure for a long time. This shape deformation has disturbed the uniformity of cell gap inside the display region and caused a circular display nonuniformity.

The influences of a finish accuracy of the cell gap in the vicinity of the seal and the accuracy of the cell gap uniformity inside the display region exerted on the display quality are especially significant particularly in the case of the STN type liquid crystal display device requiring a surface flatness of not greater than 0.05 $\mu$m.

Furthermore, according to the aforementioned prior art method, the extension of the seal member through pressing and the hardening of the seal member are made to concurrently progress. Therefore, according to a multi-daylight press where a plurality of pairs (10 to 15 pairs) of electrode substrates are stacked, variations occur in the temperature rise of the substrate and the press pressure according to the stratal positions of the electrode substrates, and this consequently causes a problem that the cell gap finish differs depending on the stratal position.

In detail, the upper and lower electrode substrates located close to the surface plates are rapidly increased in temperature since they are located close to the heat source, while the electrode substrates located in the middle stratal positions located far apart from the surface plates are slowly increased in temperature. Then, the seal hardening progresses more rapidly at the seals that are rapidly increased in temperature, and this eventually lose the balance of pressurization.

SUMMARY OF THE INVENTION

The object of the present invention is therefore to provide a liquid crystal display device manufacturing method which is excellent in cell gap uniformity in the vicinity of a seal and inside a display region, able to manufacture a liquid crystal display device of a high-quality display presentation and able to suppress the variation in cell gap depending on the stratal positions of substrates even when a multi-daylight press is used in the substrate bonding process.

In order to achieve the above object, there is provided a liquid crystal display device manufacturing method for manufacturing a liquid crystal display device where two substrates each having a surface on which a display use electrode is formed are bonded together with the surfaces on which the display use electrodes are formed made to face each other with interposition of a seal member and a spacer and a liquid crystal material is infused in a gap between the two substrates, the process of bonding together the two substrates on which the display use electrodes are formed comprising the steps of:

bonding together the two substrates with interposition of the seal member and the spacer;

pressurizing in a normal temperature state the substrates bonded together according to a specified pressurization profile; and pressurizing in a heating state the substrates according to the pressurization profile whose maximum pressure is set smaller than a maximum pressure in the normal temperature state, thereby hardening the seal member.

According to the above construction, by performing the pressurization at a normal temperature (i.e., without heating) prior to the pressurizing process with heating, the seal member is sufficiently extended in the horizontal direction. Then, after the seal member is extended, the substrates are heated while being supported by a pressure smaller than then the pressure at the normal temperature so as to harden this seal member. That is, the present invention performs the pressing of the seal member for adjusting the cell gap to the desired value and hardening of the seal member not concurrently but separately. Therefore, the heating time can be reduced and the pressure in the heating stage can be reduced in comparison with the prior art method which has performed the hardening of the seal member concurrently with the control of the cell gap by pressurizing the seal member with heating. Therefore, the expansion of air inside the liquid crystal cell is suppressed. Furthermore, when the liquid crystal display device to be manufactured is provided with a color filter and a protective film inside the liquid crystal cell, the amount of generation of gas from the protective film is also suppressed. Therefore, the repulsion of the internal pressure of the liquid crystal cell in the heating and pressurizing stage is alleviated, thereby allowing a cell gap uniformity in the vicinity of the seal member to be obtained. As a result, the display nonuniformity in the vicinity of the seal member is reduced.

Furthermore, according to the pressurizing process with heating for the hardening of the seal member, a pressure (for example, having a half magnitude) smaller than the maximum pressure in the normal temperature state is used, and therefore, a thermal stress and a stress due to the pressurization exerted on the spacer (referred to as an intra-cell spacer hereinafter) inside the liquid crystal cell (i.e., the inside of the seal member) are alleviated. Therefore, the deformation of the intra-cell spacer is suppressed, thereby allowing a satisfactory cell gap uniformity in the display region can be obtained. As a result, the occurrence of the display nonuniformity (a circular display nonuniformity when the intra-cell spacer is provided by spherical plastic beads) inside the display region is suppressed.

In an embodiment of the present invention, a specified pressure smaller than the maximum pressure in the normal temperature state is applied to the substrates before the attainment of a hardening temperature of the seal member in the heating state.

According to this construction, the hardening temperature of the seal member is achieved after the application of the specified pressure lower than the pressure in the normal temperature state, and therefore, the seal member can be hardened while maintaining the state of the seal member extended by a high pressure in the normal temperature state. Therefore, the problems accompanying the prior art manufacturing method, i.e., the bad influence on the finish accuracy of the seal due to the internal pressure of the liquid crystal cell in the heating and pressurizing stage can be effectively prevented.

In an embodiment of the present invention, the pressurization in the normal temperature state and the pressurization in the heating state are performed by means of different press machines.

The present inventors have conducted experiments by the prior art method of concurrently performing the adjustment of the cell gap and the hardening of the seal member. As a result, it was discovered that, when concurrently processing a stack of a plurality of pairs of substrates bonded together, a more significant variation in cell gap finish resulted as the substrates were located closer to the upper and lower heat sources, and a superior uniformity in the vicinity of the seal was obtained as the substrates were located in the center position farther apart from the heat sources. Furthermore, a variation in the press pressure occurred depending on the stratal position, and in a place where the press pressure is small, the seal could not sufficiently extend and the cell gap in the vicinity of the seal became partially greater than the designed value. On the other hand, in the place where a press pressure is high, the intra-cell spacer was loaded with a heavy load, resulting in deteriorating an intra-screen uniformity.

In contrast to this, the manufacturing method of the present invention performs the pressing of the substrates for the adjustment of the cell gap in a non-heating state as described above and performs the heating only in the seal member hardening process stage. Accordingly, even when a plurality of pairs of substrates bonded together, i.e., the plurality of liquid crystal display devices are stacked, no variation depending on the stratal position occurs in the temperature rise and the press pressure between these plurality of liquid crystal display devices. Therefore, regardless of the stratal position, the liquid crystal display devices have a unified cell gap.

In an embodiment of the present invention, the pressurization in the normal temperature state and the pressurization in the heating state are performed by means of different press machines.

When the pressurization in the normal temperature state and the pressurization in the heating state are performed by means of one press machine, much time is required for the restoration of the heating state into the normal temperature state and a temperature setting must be performed again every heating process. In contrast to this, according to the method of the present inventive aspect, the pressurization in the normal temperature state and the pressurization in the heating state are performed by means of different press machines. This arrangement makes the temperature control easy and increases the production efficiency.

The liquid crystal display device manufacturing method of the present invention can provide a liquid crystal display device in which the cell gap becomes uniform both in the vicinity of the seal and in the display region. Therefore, the manufacturing method of the present invention is appropriate for manufacturing an STN type liquid crystal display device or a ferroelectric type liquid crystal display device requiring a high cell gap accuracy.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3A shows a state in which a pair of bonded substrates are pressurized, and FIG. 3B shows a state in which a plurality of pairs of bonded substrates are pressurized while being stacked on one another;

FIGS. 5A–1 through 5B–3 are views each showing a pressurization profile, evaluation results of the finish of four sides of a manufactured liquid crystal display device and evaluation results of the finish of the corners, those belonging to comparison examples for evaluating the effects of the manufacturing method of the above embodiment;

FIGS. 6A–1 through 6B–3 are views each showing a pressurization profile, evaluation results of the finish of four sides of a manufactured liquid crystal display device and evaluation results of the finish of the corners, those belonging to experimental examples for evaluating the effects of the manufacturing method of the above embodiment;

FIGS. 7A–1 through 7B–3 are views each showing a pressurization profile, evaluation results of the finish of four sides of a manufactured liquid crystal display device and evaluation results of the finish of the corners, those belonging to experimental examples for evaluating the effects of the manufacturing method of the above embodiment;

FIGS. 8A–1 through 8B–3 are views each showing a pressurization profile, evaluation results of the finish of four sides of a manufactured liquid crystal display device and evaluation results of the finish of the corners, those belonging to experimental examples for evaluating the effects of the manufacturing method of the above embodiment;

FIGS. 9A–1 through 9B–3 are views each showing a pressurization profile, evaluation results of the finish of four sides of a manufactured liquid crystal display device and evaluation results of the finish of the corners, those belonging to experimental examples for evaluating the effects of the manufacturing method of the above embodiment;

FIGS. 10A–1 through 10A–3 are views showing a pressurization profile, evaluation results of the finish of four sides of a manufactured liquid crystal display device and evaluation results of the finish of the corners, those belonging to an experimental example for evaluating the effects of the manufacturing method of the above embodiment;

FIGS. 11A–1 through 11C–3 are views each showing a pressurization profile, evaluation results of the finish of four sides of a manufactured liquid crystal display device and evaluation results of the finish of the corners, those belonging to experimental examples for evaluating the effects of the manufacturing method of the above embodiment; and FIGS. 12A–1 through 12B–3 are views each showing a pressurization profile, evaluation results of the finish of four sides of a manufactured liquid crystal display device and evaluation results of the finish of the corners, those belonging to experimental examples for evaluating the effects of the manufacturing method of the above embodiment.

DETAILED DESCRIPTION OF THE PREFERRED EMBODIMENTS

The present invention will be described in detail below based on the embodiments thereof with reference to the accompanying drawings.

Figure 1:
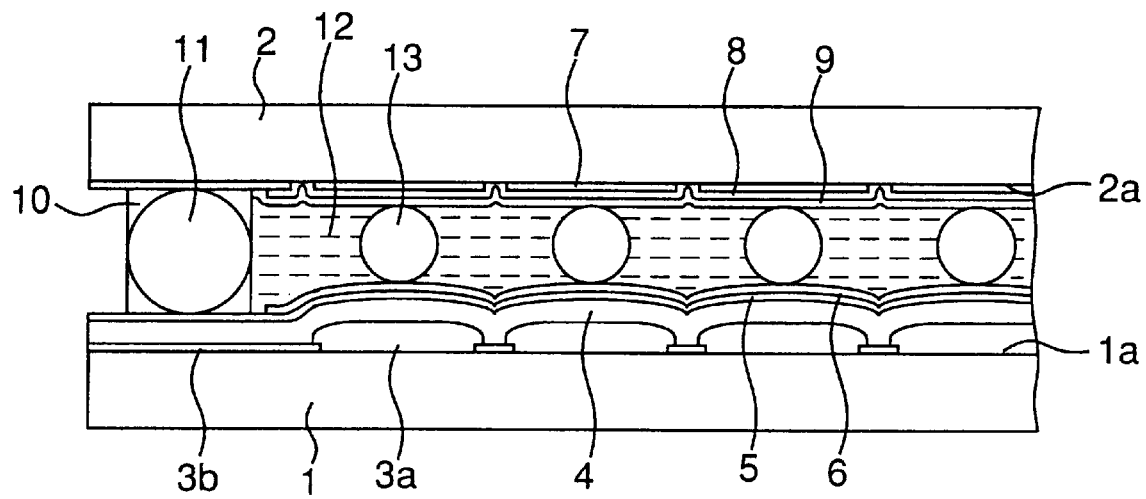
FIG. 1 is a sectional view of the essential part of an STN type color liquid crystal display device manufactured by a manufacturing method according to a first embodiment of the present invention.

FIG. 1 is a sectional view of the essential part of an STN type color liquid crystal display device manufactured by the manufacturing method of the present invention. In this figure, the reference numerals 1 and 2 denote a pair of glass substrates arranged opposite to each other. On a surface 1a of the glass substrate 1 are formed pixels 3a of R (Red), G (Green) and B (Blue), a black mask 3b formed between the pixels 3a, an overcoat film 4 which functions as a protective film of the pixels 3a, a transparent display use electrode 5 made of ITO (Tin-added Indium Oxide) and an alignment film 6 in this order. On a surface 2a of the other glass substrate 2 are formed a transparent display use electrode 7, an insulation film 8 and an alignment film 9 in this order. The pair of glass substrates 1 and 2 on which these various films are formed are bonded together with interposition of a seal member 10 arranged in the peripheral portions of the substrates. In the present embodiment, a thermosetting type one-component epoxy seal material is used as the seal member 10.

Inside the seal member 10 is arranged an intra-seal spacer 11, while an intra-cell spacer 13 is arranged in a space which is located between the glass substrates 1 and 2 and is surrounded by the seal member 10, so that a gap (cell gap) is formed between both the glass substrates 1 and 2. Then, liquid crystals are infused in this gap, thereby forming a liquid crystal layer 12.

Spherical glass beads are used for the intra-seal spacer 11, while plastic beads are used for the intra-cell spacer 13. The glass beads have a spherical shape, and therefore, they do not overlap each other in the vertical direction in contrast to glass fibers that have been conventionally generally used. Therefore, the cell gap can be easily controlled.

Although the glass substrates are used in the present embodiment, plastic substrates may be used.

A manufacturing method of the STN type liquid crystal display device shown in FIG. 1 will be described preponderantly on a bonding process relevant to the present invention with reference to FIGS. 3A and 3B and FIG. 4.

Figure 3A:
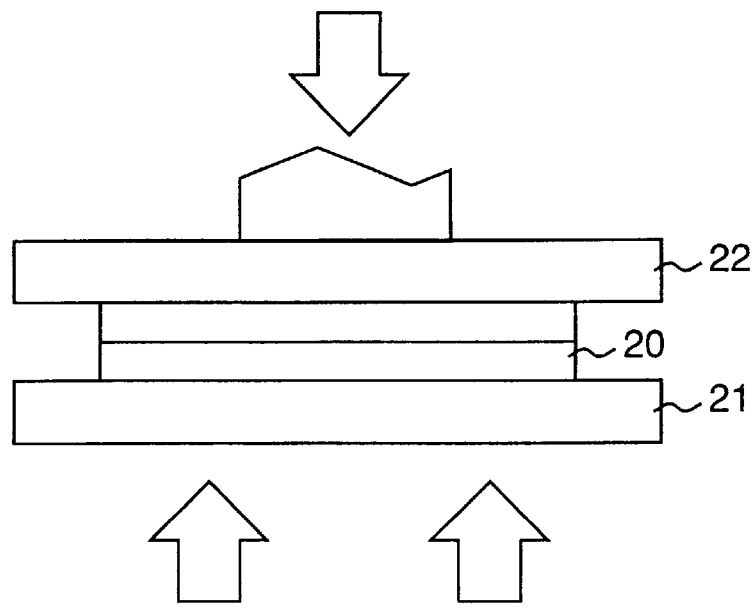
FIGS. 3A and 3B are explanatory views showing a substrate bonding process in the above embodiment, where
Figure 3B:
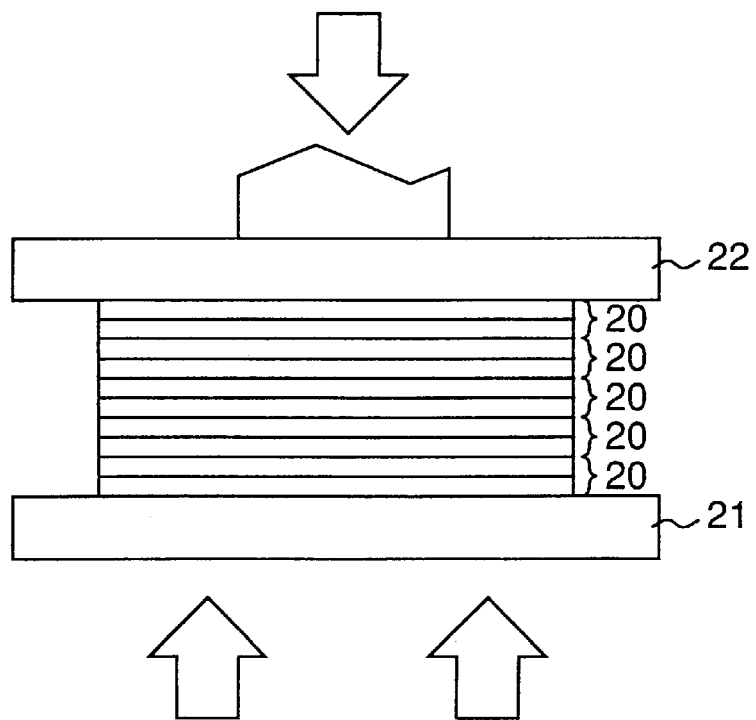

FIGS. 3A and 3B are side views showing the substrate bonding process. In FIGS. 3A and 3B, the reference numeral 20 denotes an STN type liquid crystal display device obtained after substrate bonding alignment adjustment, and its cross-section structure is similar to the one shown in FIG. 1. The reference numerals 21 and 22 denote hot plates of a hot press machine.

Figure 2:
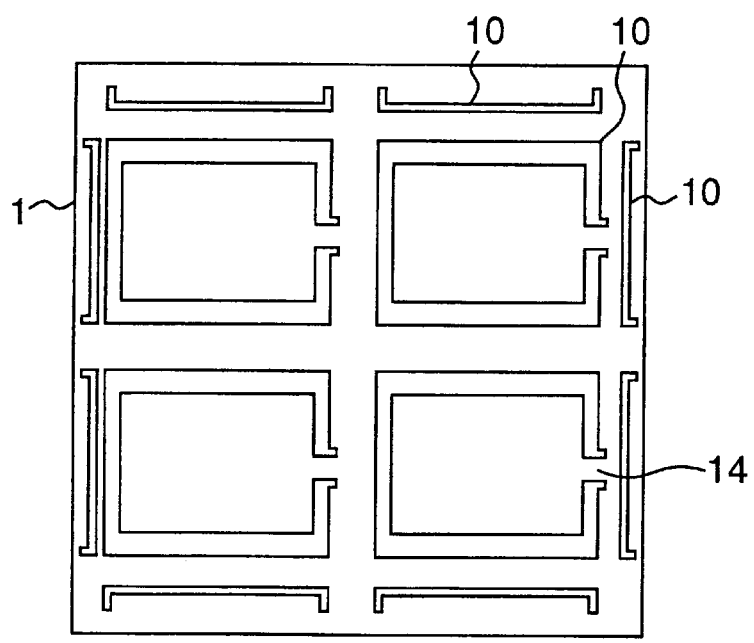
FIG. 2 is a plan view of a glass substrate of the liquid crystal display device shown in FIG. 1, showing a seal member provided on this glass substrate.

First, by a known method, the R, G and B pixels 3a, black mask 3b, overcoat film 4, display use electrode 5 and alignment film 6 are successively formed on the surface 1a of the glass substrate 1. On the other hand, the display use electrode 7, insulation film 8 and alignment film 9 are successively formed on the surface 2a of the glass substrate 2. Subsequently, plastic beads serving as the intra-cell spacer 13 are scattered or distributed on one of these glass substrates (the glass substrate 2 in the present embodiment). On the other glass substrate 1, as shown in FIG. 2, the seal member 10 having glass beads serving as the intra-seal spacer 11 are coated leaving a liquid crystal infusing opening 14.

Next, the glass substrate 1 and the glass substrate 2 are bonded together through adjustment of alignment, thereby forming an STN type liquid crystal display device 20. Then, one liquid crystal display device 20 is placed as shown in FIG. 3A or a plurality of STN type liquid crystal display devices 20 are placed as shown in FIG. 3B, between the hot plates 21 and 22. In this state, as shown in FIG. 4, one or a plurality of liquid crystal display devices 20 are pressed for about five to twenty minutes (t=5 to 20) while increasing the pressure to be applied continuously or in steps at a normal temperature of 20 to 40° C. (the room temperature with which the liquid crystal cell is familiarized) without performing heating. By this pressurizing process accompanied by no heating, the seal member 10 is securely extended without hardening the seal member 10, so that the cell gap uniformity in the vicinity of the seal member and the cell gap uniformity in the display region are improved.

Figure 4:
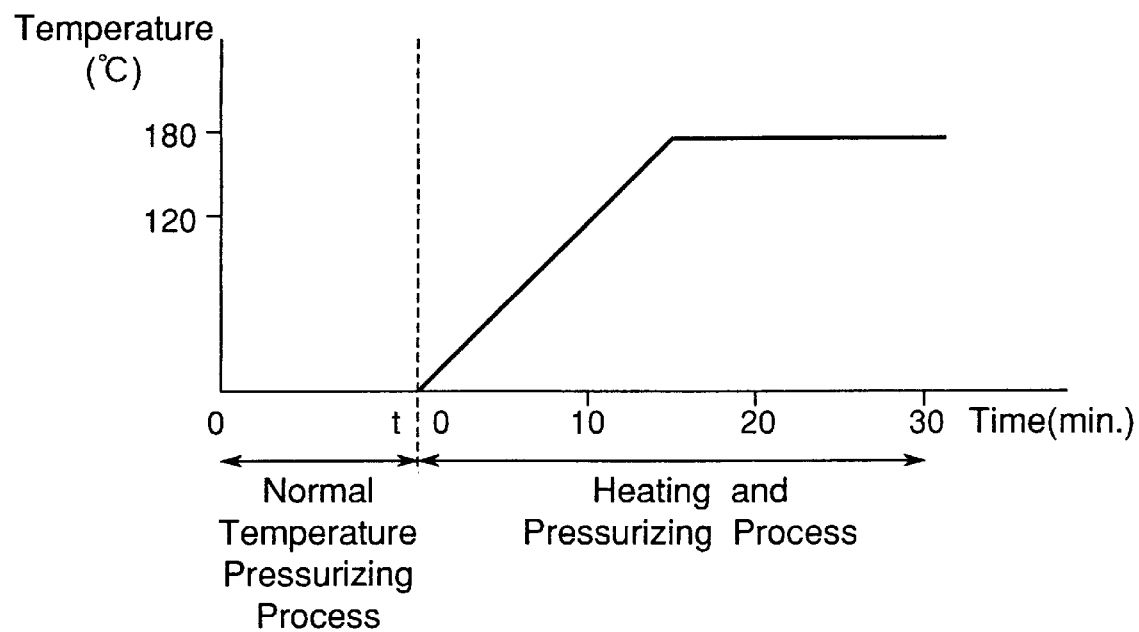
FIG. 4 is a graph showing a heating profile used in the above embodiment.

Next, the applied pressure in the normal temperature state is once released, and thereafter the one or the plurality of liquid crystal display devices 20 are pressed by a pressure having a magnitude of 25% to 100% or preferably 50% of the maximum application pressure in the normal temperature state while increasing the substrate temperature by heating in, for example, a temperature profile as shown in FIG. 4 by means of another similar hot press machine. It is to be noted that the temperature and the heating and pressurizing time in this stage should be properly set according to the hardening conditions of the seal member to be used. By using different hot press machines for the pressurizing process in the normal temperature state and for the pressurizing process in the heating state, the production efficiency is improved and the temperature control is made easy. It is to be noted that the use of different hot press machines is not a necessary condition of the manufacturing method of the present invention, and it is acceptable to use an identical press machine.

Subsequently, each liquid crystal display device 20 obtained through the bonding process is subjected to an after-backing process, and a liquid crystal material is infused from the liquid crystal infusing opening 14, which is followed by the sealing of the liquid crystal infusing opening 14. Thus, the liquid crystal display device shown in FIG. 1 is completed.

Figures 1, 6A:
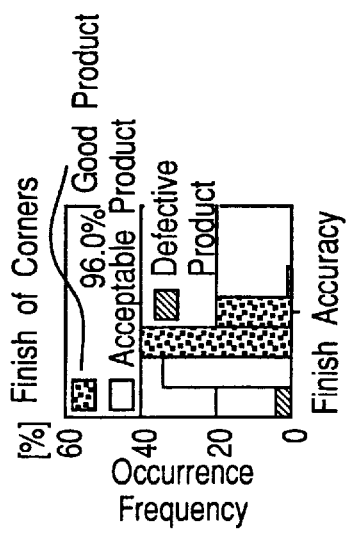
Figures 2, 6A:
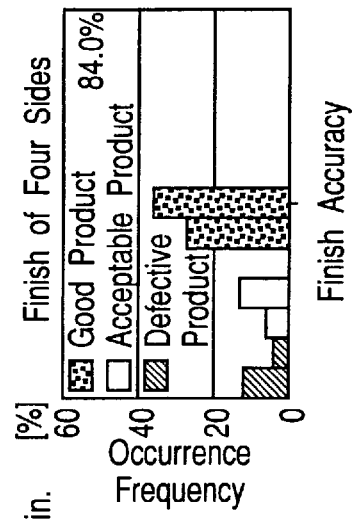
Figures 3, 6A:
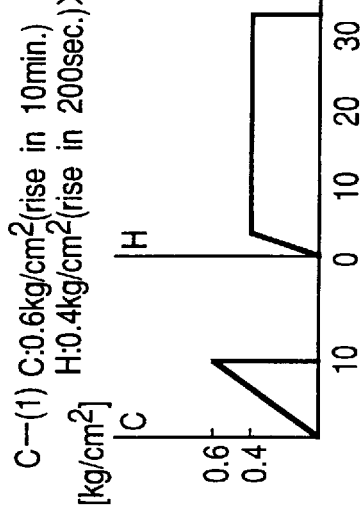
Figures 1, 6B:
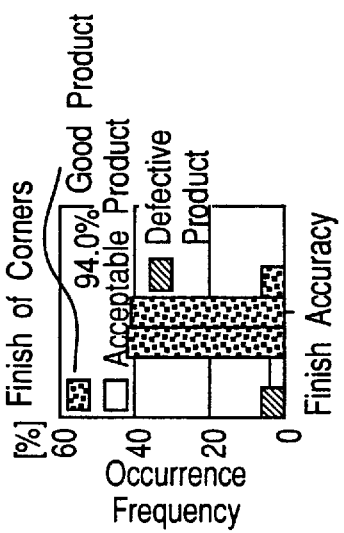
Figures 2, 6B:
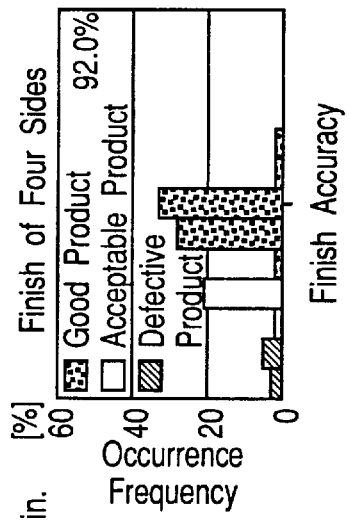
Figures 3, 6B:
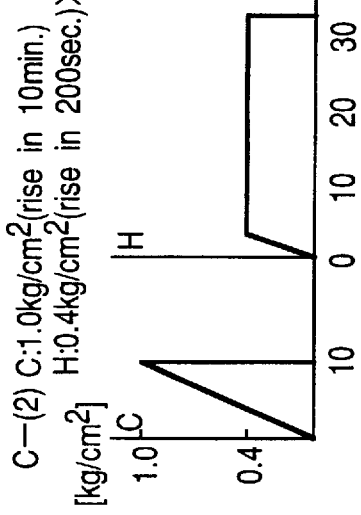
Figures 3, 8A:
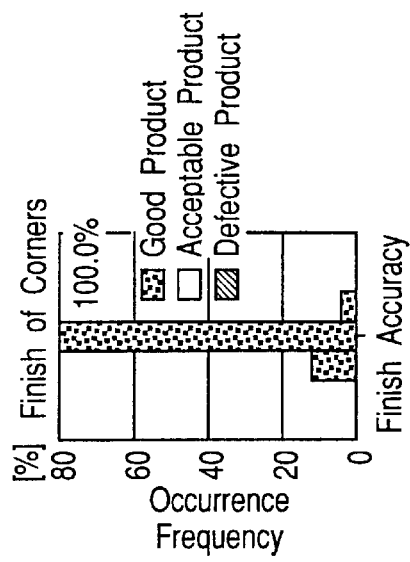
Figures 3, 8B:
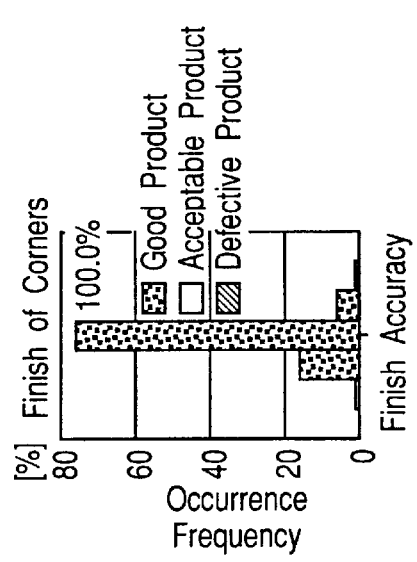
Figures 2, 8A:
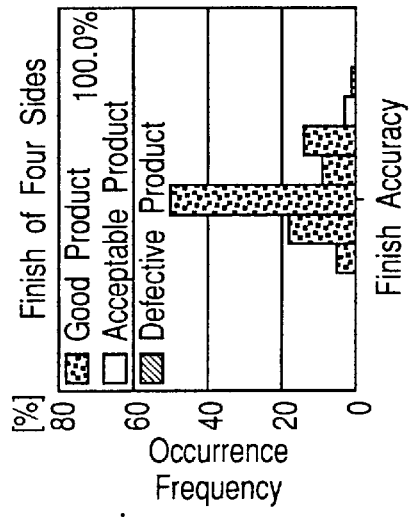
Figures 2, 8B:
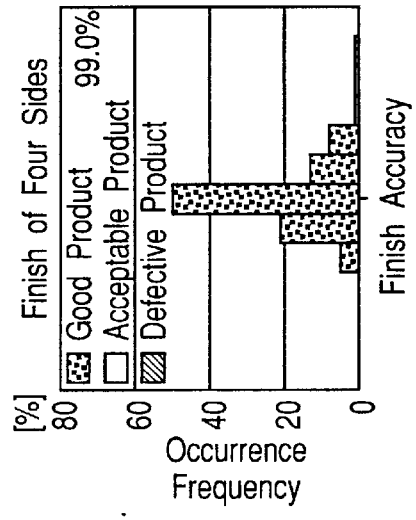
Figures 1, 8A:
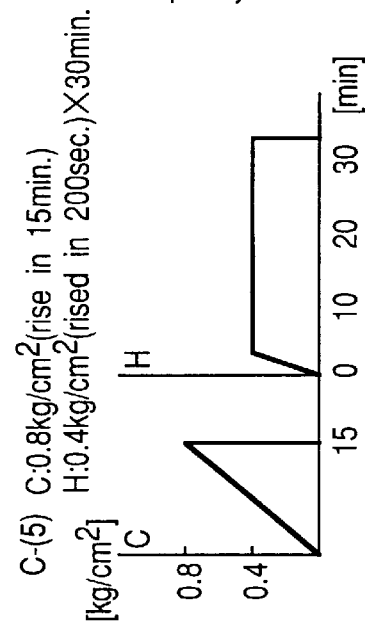
Figures 1, 8B:
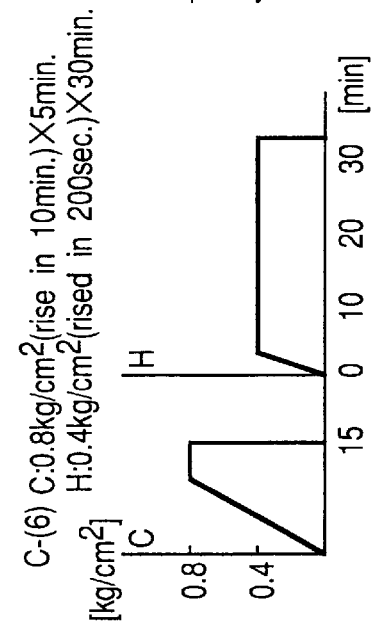
Figures 3, 9A:
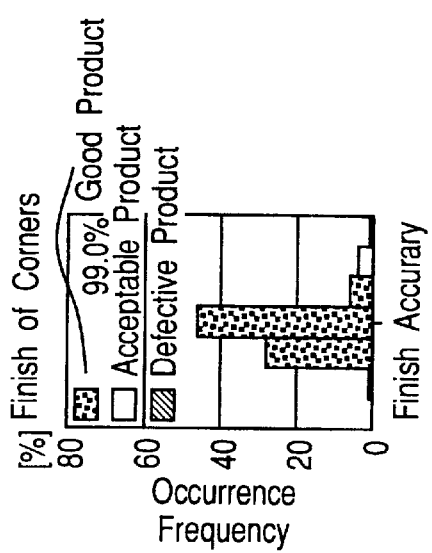
Figures 2, 9A:
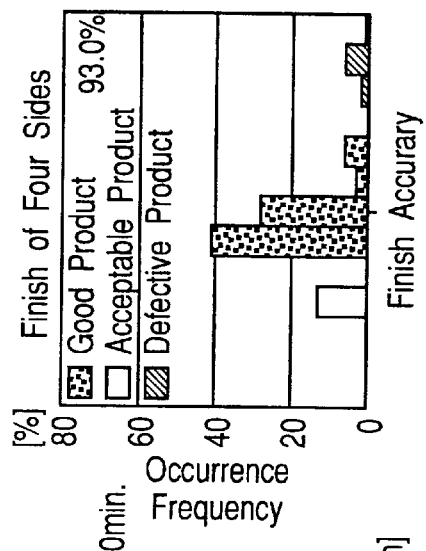
Figures 1, 9A:
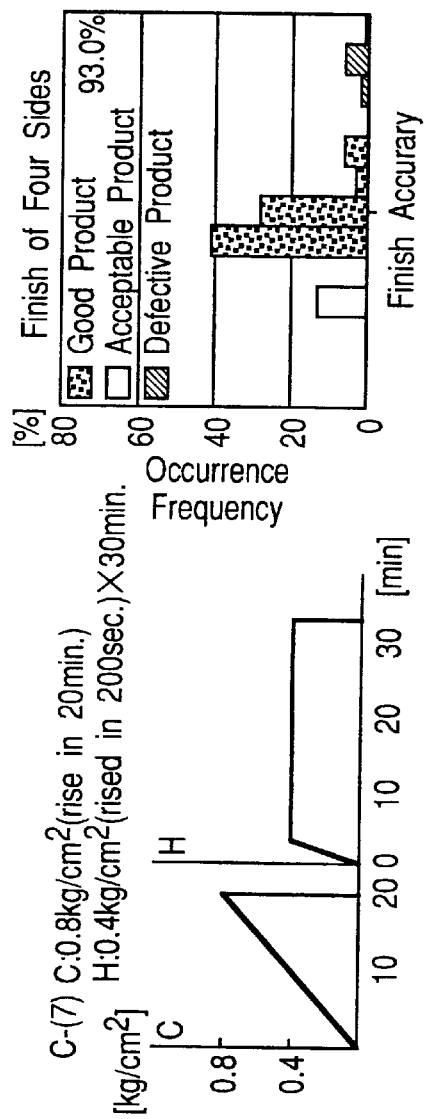
Figures 3, 9B:
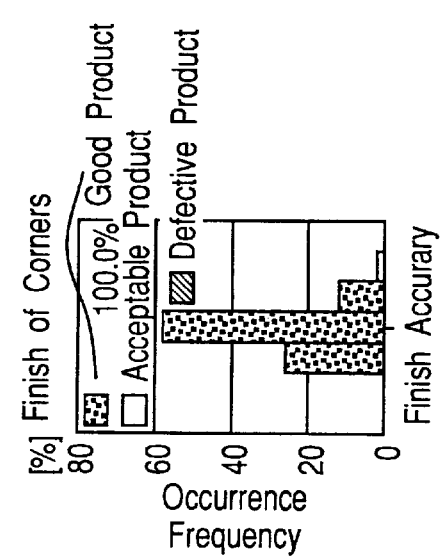
Figures 2, 9B:
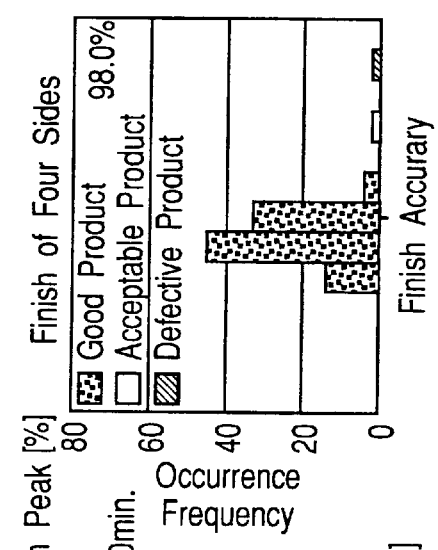
Figures 1, 9B:
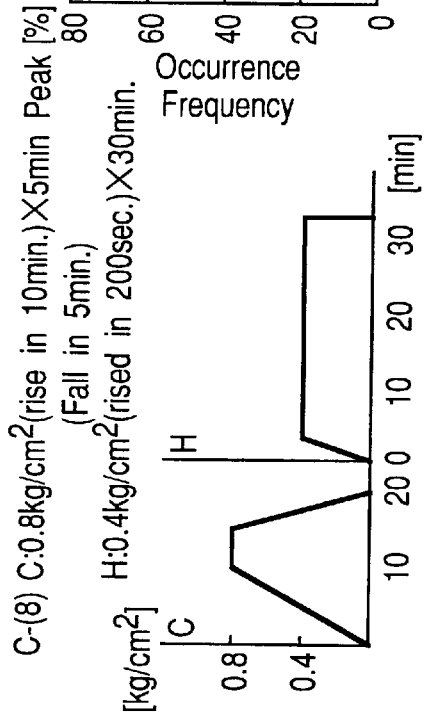
Figures 3, 10A:
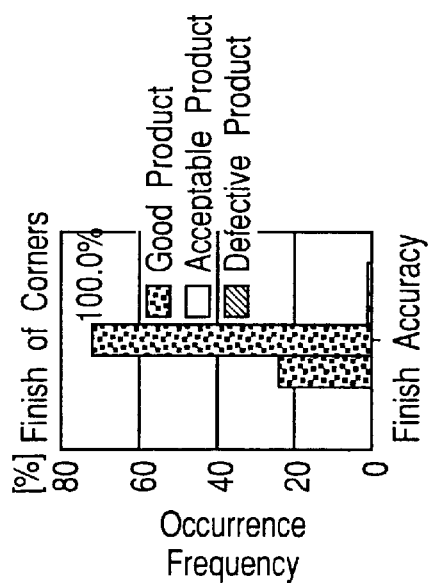
Figures 2, 10A:
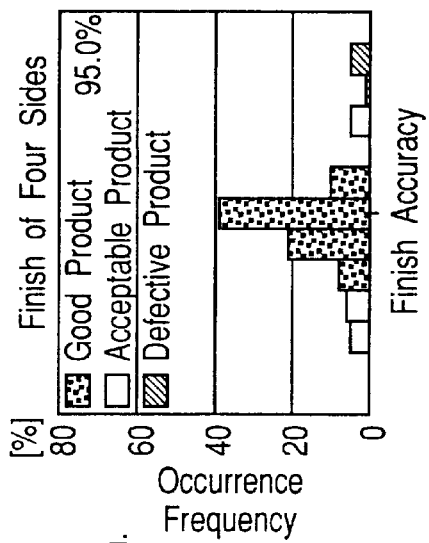
Figures 1, 10A:
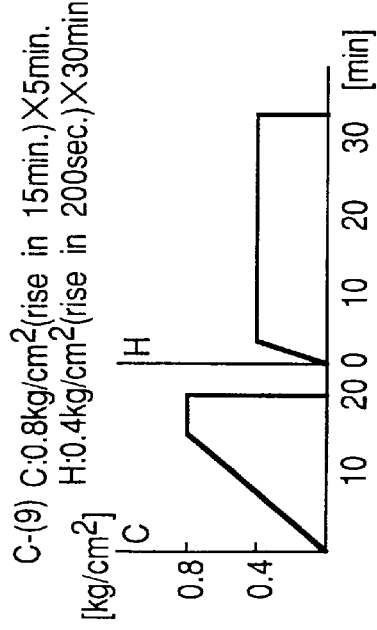
Figures 3, 11A:
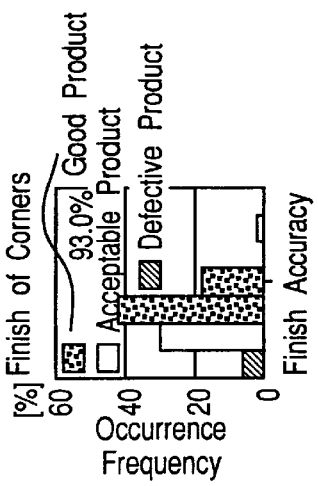
Figures 2, 11A:
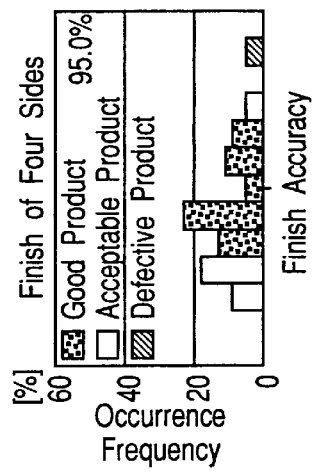
Figures 1, 11A:
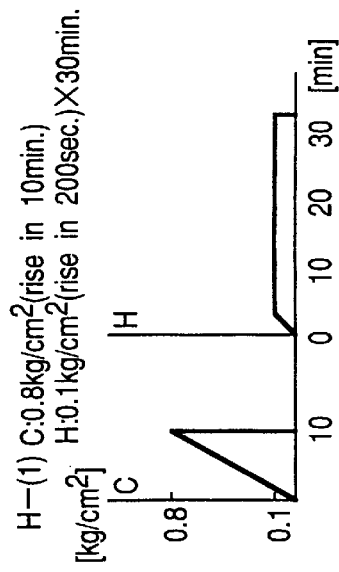
Figures 3, 11B:
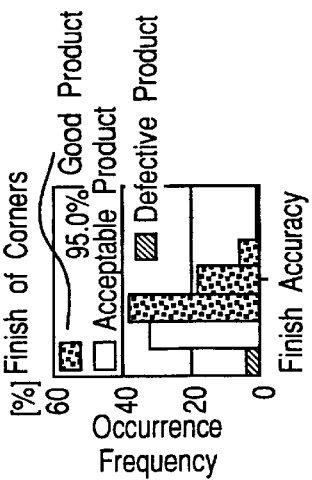
Figures 2, 11B:
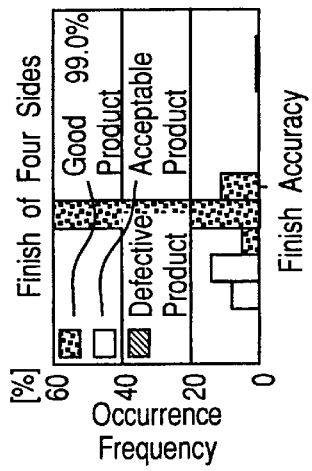
Figures 1, 11B:
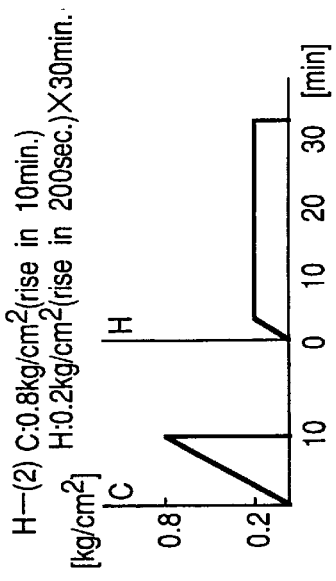
Figures 3, 11C:
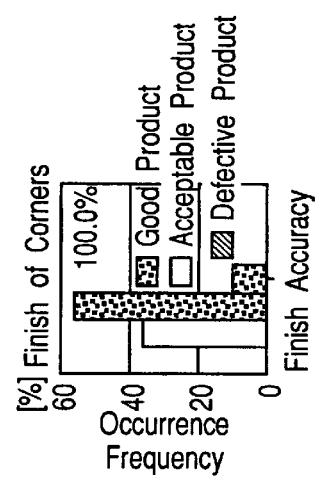
Figures 2, 11C:
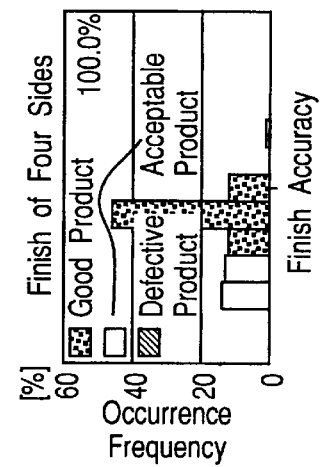
Figures 1, 11C:
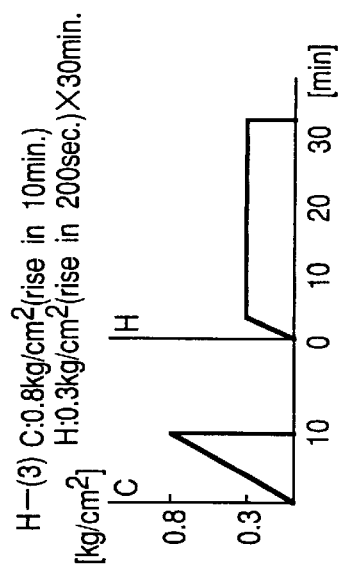
Figures 3, 12A:
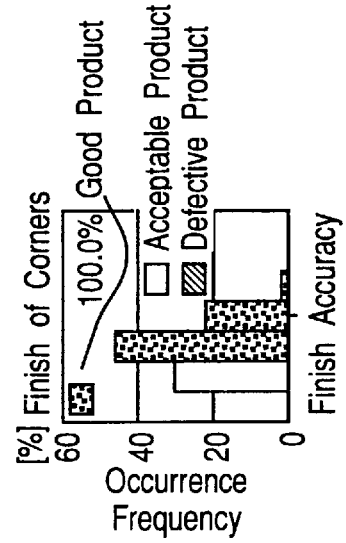
Figures 2, 12A:
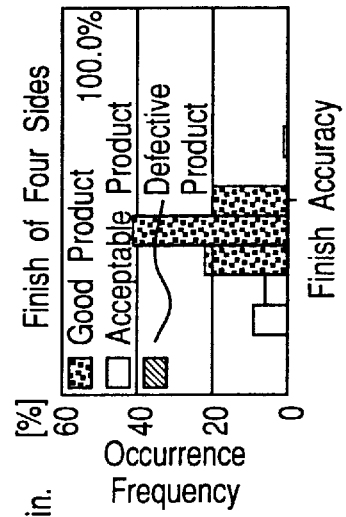
Figures 1, 12A:
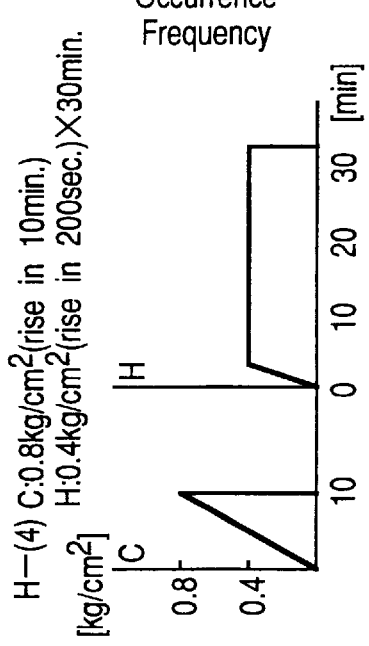
Figures 3, 12B:
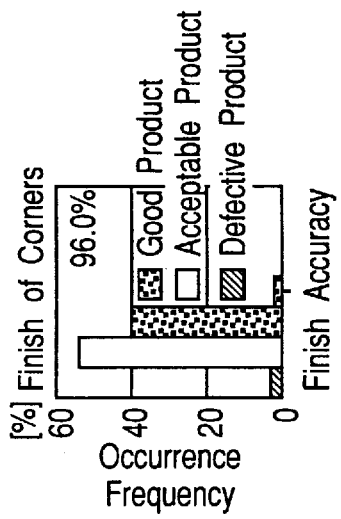
Figures 2, 12B:
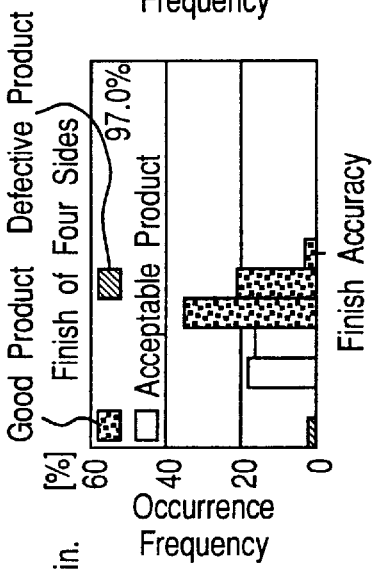
Figures 1, 12B:
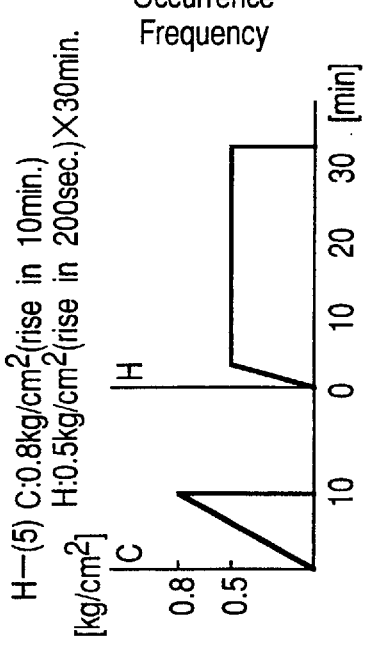

Next, for inspecting the effects of the pressurization in the normal temperature state according to the present invention, a 11.3-inch type STN color liquid crystal display device having the cross-section structure shown in FIG. 1 was used for evaluating the finish accuracy of the four sides and the finish accuracy of the corners of the liquid crystal display device by a 10-strata multi-daylight press system with the application pressure in the normal temperature state used as a parameter. FIGS. 5A–1 through 5A–3 show the pressurization profile and evaluation results of a first comparative example, while FIGS. 6A–1 through 10A–3 show the pressurization profiles and evaluation results of experimental examples C-(1), C-(2), C-(3), C-(4), C-(5), C-(6), C-(7), C-(8) and C-(9) of the present invention. It is to be noted that the heating profiles in these cases are as shown in FIG. 4. In the heating and pressurizing process, the temperature reached the temperature at which the seal member started to be hardened (measured seal temperature: about 120° C.) in 10 minutes from the start of heating, and subsequently the temperature continued to rise to reach the seal hardening temperature (measured seal temperature: about 180° C.), the temperature kept constant until the pressure was released. A temperature t in the normal temperature pressurizing process was about 26° C.

In the first comparative example shown in FIGS. 5A–1 through 5A–3, no pressurization was performed in the normal temperature state, then the pressure was increased to 0.8 kg/cm² in 200 seconds in the heating state, and thereafter the pressure was maintained for 30 minutes. On the other hand, the pressurization profiles in the normal temperature state of the experimental examples C-(1), C-(2), C-(3), C(4), C-(5), C-(6), C-(7), C-(8) and C-(9) were as follows. In the heating state, the pressure was increased to 0.4 kg/cm² in 200 seconds and thereafter the pressure was maintained for 30 minutes in each case.

Experimental Example C-(1)

The pressure was increased to 0.6 kg/cm² in 10 minutes, and thereafter the pressure was released.

Experimental Example C-(2)

The pressure was increased to 1.0 kg/cm² in 10 minutes, and thereafter the pressure was released.

Experimental Example C-(3)

The pressure was increased to 0.8 kg/cm² in 5 minutes, and thereafter the pressure was maintained for 5 minutes.

Experimental Example C-(4)

The pressure was increased to 0.8 kg/cm² in 10 minutes, and thereafter the pressure was released.

Experimental Example C-(5)

The pressure was increased to 0.8 kg/cm² in 15 minutes, and thereafter the pressure was released.

Experimental Example C-(6)

The pressure was increased to 0.8 kg/cm² in 10 minutes, and thereafter the pressure was maintained for 5 minutes.

Experimental Example C-(7)

The pressure was increased to 0.8 kg/cm² in 20 minutes, and thereafter the pressure was released.

Experimental Example C-(8)

The pressure was increased to 0.8 kg/cm² in 10 minutes, and thereafter the pressure was maintained for 5 minutes and then reduced to zero pressure in 5 minutes.

Experimental Example C-(9)

The pressure was increased to 0.8 kg/cm² in 15 minutes, and thereafter the pressure was maintained for 5 minutes.

In the graphs showing the evaluation results of the finish of the four sides and the graphs showing the evaluation results of the corners shown in FIGS. 5A–2, 5A–3, 5B–2, 5B–3, 6A–2, 6A–3, 6B–2, 6B–3, 7A–2, 7A–3, 7B–2, 7B–3, 8A–2, 8A–3, 8B–2, 8B–3, 9A–2, 9A–3, 9B–2, 9B–3, 10A–2, 10A–3, 11A–2, 11A–3, 11B–2, 11B–3, 11C–2, 11C–3, 12A–2, 12A–3, 12B–2 and 12B–3 described later, the horizontal axis represents the finish accuracy, and the vertical axis represents the occurrence frequency. The desired finish corresponds to just the center position (the position illustrated with short vertical bars) of the horizontal axis. The closer the position is to the right away from the center position of the horizontal axis, the more the portions having a large cell gap increase, causing a deteriorated finish accuracy. The closer the position is to the left away from the center position of the horizontal axis, the more the portions having a small cell gap increase, also causing a deteriorated finish accuracy. Therefore, in regard to the finish of the four sides, the products located within a range including the center one, two displaced leftward and two displaced rightward (within the range including the five in total) are determined to be the "good products". The products located in the range including two at the right-hand end and the products located in the range including two at the left-hand end are determined to be the "defective products". The products located between them are determined to be the "acceptable products". In regard to the finish of the corners, the products located within a range including the center one in the horizontal axis, one displaced leftward and one displaced rightward (within the range including the three in total) are determined to be the "good products". The products located in the range including one at the right-hand end and the products located in the range including one at the left-hand end are determined to be the "defective products". The products located between them are determined to be the "acceptable products". The "good products" and the "acceptable products" are the ones that can be used as commercial products. It is to be noted that the percentage (referred to as a "finish stability" hereinafter) shown at the upper right-hand corner of each graph is the sum total of the occurrence frequency of the "good products" and the occurrence frequency of the "acceptable products". The grater the value is, the greater the ratio of the occurrence of the products that can be used as the commercial products is, and also the smaller the ratio of the occurrence of the defective products that cannot be used as the commercial products is. Therefore, the above case can be considered to be a stable finish having a small variation.

Comparing the first comparative example with the experimental examples in terms of the "finish stability", the following results. With regard to the finish of the four sides, in contrast to 70% of the first comparative example, the experimental examples C-(1), C-(2), C-(3), C(4), C-(5), C-(6), C-(7), C-(8) and C-(9) exhibit the remarkably increased values of 84.0%, 92.0%, 92.0%, 97.0%, 100.0%, 99.0%, 93.0%, 98.0% and 95.0%, respectively. With regard to the finish of the corners, in contrast to 84.0% of the first comparative example, the experimental examples C-(1), C-(2), C-(3), C-(4), C-(5), C-(6), C-(7), C-(8) and C-(9) exhibit the increased values of 96.0%, 94.0%, 100.0%, 98.0%, 100.0%, 100.0%, 99.0%, 100.0% and 100.0%, respectively, the values being superior to that of the first comparative example in terms of the "finish stability". Furthermore, in view of only the occurrence frequency of the "good products" having the most desirable cell gap finish, the experimental examples have remarkably increased values in comparison with that of the first comparative example as is apparent from the figures. The above results proved the fact that the pressurization in the normal temperature state was effective.

Next, for inspecting the effects of making the magnitude of the pressure in the heating state smaller than the pressure in the normal temperature state according to the present invention, a 12.1-inch type STN color liquid crystal display device having a cross-section structure as shown in FIG. 1 was used for evaluating the finish accuracy of the four sides and the finish accuracy of the corners of the liquid crystal display device by a 10-strata multi-daylight press system with the application pressure in the heating state used as a parameter. FIGS. 5B–1 through 5B–3 show the pressurization profile and evaluation results of a second comparative example, while FIGS. 11A–1 through 12B–3 show the pressurization profiles and evaluation results of experimental examples H-(1), H-(2), H-(3), H-(4) and H-(5) of the present invention. The heating profiles in these cases are as shown in FIG. 4. In the heating and pressurizing process, the temperature reached the temperature at which the seal member started to be hardened (measured seal temperature: about 120° C.) in 10 minutes after the start of heating, and subsequently the temperature continued to rise to reach the seal hardening temperature (measured seal temperature: about 180° C.), the temperature kept constant until the pressure was released. The temperature t in the normal temperature pressurizing process was about 26° C.

In the second comparative example shown in FIGS. 5B–1 through 5B–3, the pressure was increased to 0.8 kg/cm$^2$ in 200 seconds in the heating state while performing no pressurization in the normal temperature state, and thereafter the pressure was maintained for 30 minutes. On the other hand, the pressurization profiles were identical in the normal temperature state with regard to the experimental examples H-(1), H-(2), H-(3), H-(4) and H-(5), where the pressure was increased to 0.8 kg/cm$^2$ in 10 minutes. Then, the pressurization profiles in the heating state were as follows.

Experimental Example H-(1)

The pressure was increased to 0.1 kg/cm$^2$ in 200 seconds, and thereafter the pressure was maintained for 30 minutes.

Experimental Example H-(2)

The pressure was increased to 0.2 kg/cm$^2$ in 200 seconds, and thereafter the pressure was maintained for 30 minutes.

Experimental Example H-(3)

The pressure was increased to 0.3 kg/cm$^2$ in 200 seconds, and thereafter the pressure was maintained for 30 minutes.

Experimental Example H-(4)

The pressure was increased to 0.4 kg/cm$^2$ in 200 seconds, and thereafter the pressure was maintained for 30 minutes.

Experimental Example H-(5)

The pressure was increase to 0.5 kg/cm$^2$ in 200 seconds, and thereafter the pressure was maintained for 30 minutes.

Comparing the second comparative example with the experimental examples in terms of the finish stability ("occurrence frequency of good products"+"occurrence frequency of acceptable products"), the following results. With regard to the finish of the four sides, in contrast to 88.0% of the second comparative example which had no pressurizing process in the normal temperature state and increased the pressure to 0.8 kg/cm$^2$ simultaneously with heating, the experimental examples H-(1), H-(2), H-(3), H(4) and H-(5) which applied a pressure in the normal temperature state and thereafter applied a pressure smaller than the pressure (maximum pressure) while heating obtained the very good values of 95.0%, 99.0%, 100.0%, 100.0% and 97.0%, respectively. With regard to the finish of the corners, in contrast to 91.0% of the second comparative example, the experimental examples H-(1), H-(2), H-(3), H(4) and H-(5) exhibited the values of 93.0%, 95.0%, 100.0%, 100.0%, and 96.0%, respectively. Furthermore, in view of only the occurrence frequency of the "good products" having the most desirable cell gap finish, the experimental examples have increased values in comparison with that of the second comparative example as is apparent from the figures. The above results proved the fact that the practice of performing pressurization in the normal temperature state and subsequently applying the pressure smaller than the pressure (maximum pressure) of the above process in the heating state was effective. Furthermore, it was discovered that a specifically high effect was able to be obtained when the magnitude of the pressure to be applied in the heating state is not smaller than one-fourth (25%) of the pressure to be applied in the normal temperature state. The pressure at the time is preferably set so as not to exceed 1 kg/cm$^2$ at maximum.

Through the above experiments, a superior cell gap uniformity in the vicinity of the seal than those of the first comparative example and second comparative example was obtained, thereby allowing the display nonuniformity in the vicinity of the seal to be reduced. Furthermore, by virtue of the small degree of deformation of the plastic beads, the cell gap uniformity in the display region was also improved, so that the generation of the circular display nonuniformity was suppressed.

Although the present embodiment has been described on the basis of the manufacturing of the STN type liquid crystal display device, the manufacturing method of the present invention is also appropriate for the manufacturing of a ferroelectric type liquid crystal display device and is able to be applied to liquid crystal display devices of the other types besides the STN type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a liquid crystal display device where two substrates each having a surface on which a display use electrode is formed are bonded together with the surfaces on which the display use electrodes are formed made to face each other with interposition of a seal member, a spacer and a liquid crystal material in a gap between the two substrates, the process of bonding together the two substrates on which the display use electrodes are formed comprising the steps of:

bonding together the two substrates with interposition of the seal member and the spacer;

pressurizing in a normal temperature state the substrates bonded together according to a specified pressurization profile for a first period of time; and pressurizing in a heating state the substrates according to the pressurization profile whose maximum pressure is set smaller than a maximum pressure in the normal temperature state for a second period of time, thereby hardening the seal member.

2. A liquid crystal display device manufacturing method as claimed in claim 1, wherein a specified pressure smaller than the maximum pressure in the normal temperature state is applied to the substrates before the attainment of a hardening temperature of the seal member in the heating state.

3. A liquid crystal display device manufacturing method as claimed in claim 1, wherein the pressurization in the normal temperature state and the heating state in the bonding process is performed by stacking a plurality of pairs of two substrates bonded together.

4. A liquid crystal display device manufacturing method as claimed in claim 2, wherein the pressurization in the normal temperature state and the heating state in the bonding process is performed by stacking a plurality of pairs of two substrates bonded together.

5. A liquid crystal display device manufacturing method as claimed in claim 1, wherein the pressurization in the normal temperature state and the pressurization in the heating state are performed by means of different press machines.

6. A liquid crystal display device manufacturing method as claimed in claim 2, wherein the pressurization in the normal temperature state and the pressurization in the heating state are performed by means of different press machines.

7. A liquid crystal display device manufacturing method as claimed in claim 3, wherein the pressurization in the normal temperature state and the pressurization in the heating state are performed by means of different press machines.

8. A liquid crystal display device manufacturing method as claimed in claim 1, wherein the liquid crystal display device is an STN type liquid crystal display device or a ferroelectric type liquid crystal display device.

9. A liquid crystal display device manufacturing method as claimed in claim 2, wherein the liquid crystal display device is an STN type liquid crystal display device or a ferroelectric type liquid crystal display device.

10. A liquid crystal display device manufacturing method as claimed in claim 3, wherein the liquid crystal display device is an STN type liquid crystal display device or a ferroelectric type liquid crystal display device.

11. A liquid crystal display device manufacturing method as claimed in claim 4, wherein the liquid crystal display device is an STN type liquid crystal display device or a ferroelectric type liquid crystal display device.

12. A method for manufacturing a liquid crystal display device comprising the steps of:

interposing a seal member between two substrates;

bonding the two substrates together;

pressurizing the bonded substrates at a first pressure and at a normal temperature for a first period of time; and pressurizing the bonded substrates at a second pressure lower than the first pressure and at an elevated temperature higher than the normal temperature for a second period of time.

13. A method for manufacturing a liquid crystal display device comprising the steps of:

interposing a seal member between two substrates;

bonding the two substrates together;

pressurizing the bonded substrates at a first pressure profile and at a normal temperature for a first period of time; and pressurizing the bonded substrates at a second pressure profile whose maximum pressure is lower than the maximum pressure of the first pressure profile, and at an elevated temperature higher than the normal temperature for a second period of time.

14. A method for manufacturing a liquid crystal display device comprising the steps of:

interposing a seal member between two substrates;

bonding the two substrates together;

pressurizing the bonded substrates at a first pressure profile and at a first temperature for a first period of time; and pressurizing the bonded substrates at a second pressure profile whose maximum pressure is lower than the maximum pressure of the first pressure profile, and at a second temperature higher than the first temperature for a second period of time.

* * * * *